United States Patent
Zhao et al.

(10) Patent No.: US 9,264,925 B2
(45) Date of Patent: Feb. 16, 2016

(54) SYSTEMS AND METHODS FOR LTE INTERFERENCE DETECTION

(71) Applicant: Marvell World Trade Ltd., St. Michael (BB)

(72) Inventors: Qing Zhao, Milpitas, CA (US);
Hui-Ling Lou, Sunnyvale, CA (US);
Leilei Song, Sunnyvale, CA (US);
Yi-Ling Chao, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 146 days.

(21) Appl. No.: 14/210,910

(22) Filed: Mar. 14, 2014

(65) Prior Publication Data
US 2014/0273869 A1    Sep. 18, 2014

Related U.S. Application Data

(60) Provisional application No. 61/802,896, filed on Mar. 18, 2013.

(51) Int. Cl.
*H04B 17/00* (2015.01)
*H04B 7/00* (2006.01)
*H04B 1/10* (2006.01)
*H04M 1/00* (2006.01)
*H04W 24/08* (2009.01)
*H04W 16/14* (2009.01)
*H04W 88/06* (2009.01)
*H04W 24/02* (2009.01)

(52) U.S. Cl.
CPC .............. *H04W 24/08* (2013.01); *H04W 16/14* (2013.01); *H04W 24/02* (2013.01); *H04W 88/06* (2013.01)

(58) Field of Classification Search
CPC ..... H04W 16/14; H04W 24/02; H04W 24/08; H04W 88/06
USPC ................ 455/67.11, 500, 552.1, 553.1, 296, 455/278.1, 114.2
See application file for complete search history.

(56) References Cited

FOREIGN PATENT DOCUMENTS

| WO | WO-2012112858 | 8/2012 |
|---|---|---|
| WO | WO-2012128886 | 9/2012 |
| WO | WO-2012173926 | 12/2012 |

OTHER PUBLICATIONS

IEEE P802.11ac/D2.0, Draft Standard for Information Technology—Telecommunications and information exchange between systems—local and metropolitan area networks—specific requirements, Part 11: Wireless LAN Medium Access Control (MAC) and Physical Layer (PHY) specifications, Amendment 4: Enhancements for Very High Throughput for Operation in Bands below 6GHz, Jan. 2012.

(Continued)

*Primary Examiner* — Ankur Jain
*Assistant Examiner* — Xin Jia (57) ABSTRACT

Systems and methods are provided for identifying whether a signal is an LTE signal. The method includes receiving, using control circuitry, a signal. The method includes computing a measurement of the received signal, determining a signal parameter corresponding to a system parameter specific to an LTE standard, and identifying whether the received signal is an LTE signal based on the determined signal parameter.

18 Claims, 8 Drawing Sheets

(56) References Cited

OTHER PUBLICATIONS

IEEE P802.11g/D8.2, Draft Supplement to Standard for Information Technology—Telecommunications and information exchange between systems—local and metropolitan are networks—specific requirements, Part 11: Wireless LAN Medium Access Control (MAC) and Physical Layer (PHY) specifications: Further Higher Data Rate Extension in the 2.4 GHz Band, Apr. 2003.

Gunnam, et al., Multi-Rate Layered Decoder Architecture for Block LDPC Codes of the IEEE 802.11n Wireless Standard, Proc. of the IEEE International Symposium on Circuits and Systems (ISCAS), p. 1645-1648, 2007.

IEEE Std 802.11b, Supplement to IEEE Standard for Information Technology—Telecommunications and information exchange between systems—Local and metropolitan area networks—specific requirements, Part 11: Wireless LAN Medium Access Control (MAC) and Physical Layer (PHY) specifications: Higher-Speed Physical Layer Extension in the 2.4 GHz Band, 1999.

International Search Report and Written Opinion dated Sep. 11, 2014 for International Application No. PCT/US2014/027844, International Filing date Mar. 14, 2014, 15 pages.

Qualcomm Incorporated: In-device coexistence interference between LTE and ISM bands, 3GPP Draft; R4-102416, 3rd Generation Partnership Project (3GPP), Mobile Competence Centre; 650, Route Des Lucioles; F-06921 Sophia-antipolis Cedex; France, vol. RAN WG4, No. Bratislava; 20100628, Jun. 25, 2010, XP050454758, [retrieved on Jun. 25, 2010] p. 5, paragraph 3.1-p. 6, paragraph 3.2.

3rd Generation Partnership Project; Technical Specification Group Radio Access Network; Evolved Universal Terrestrial Radio Access (E-UTRA); Study on signaling and procedure for interference avoidance for in-device coexistence (Release 11), 3GPP Standard; 3 GPP TR 36.816, 3rd Generation Partnership Project (3GPP), Mobile Competence Centre; 650, Route Des Lucioles; F-06921 Sophia-Antipolis Cedex; France, vol. RAN WG2, No. V11.2.0, Dec. 22, 2011, pp. 1-44, XP050555147, [retrieved on Dec. 22, 2011] p. 20, line 5.2.2.1.1-p. 51, line 5.2.2.1.2.

SYSTEMS AND METHODS FOR LTE INTERFERENCE DETECTION

CROSS REFERENCE TO RELATED APPLICATION

This disclosure claims the benefit under 35 U.S.C. §119(e) of U.S. Provisional Application No. 61/802,896, filed Mar. 18, 2013, which is incorporated herein by reference in its entirety.

FIELD OF USE

This disclosure relates to a method and system for detecting properties of interference signals in a mobile communication system, such as the Long Term Evolution ("LTE") communication system.

BACKGROUND OF THE DISCLOSURE

Mobile communication devices in use today are frequently impacted by interfering signals from various sources. A mobile communication device may be impacted by neighboring mobile communication devices that operate based on the same protocol, and also by other devices that use different communication protocols. For example, a mobile communication device using the Third Generation Partnership (3GPP) LTE protocol that communicates with a serving LTE base station may be impacted by neighboring LTE base stations and also by other wireless signals, including but not limited to Wireless Local Area Network (WLAN) signals (referred to as Wi-Fi signals in the remainder of this disclosure) and Bluetooth® radio signals.

The impact of interference on a user equipment may be significant and may degrade its performance significantly. Therefore, prompt and accurate detection of interfering signals has several advantages and may help to improve user equipment performance, e.g., in terms of front-end automatic gain control, synchronization, or channel estimation.

A number of factors may increase the difficulty of identifying interfering signals. For example, the detection of interfering signals may rely in part on reference signals that are embedded into the interfering signals. Such reference signals may only be present with a certain periodicity, thereby limiting the number of measurement opportunities and increasing the time it takes to perform identification of the interfering signal. Other types of measurements may not rely on reference signals but other, more general properties associated with the interfering signals. However, such measurements lack the ability to identify some properties of the interfering signal, such as the transmission protocol associated with the interfering signal.

SUMMARY

In accordance with an embodiment of the present disclosure, systems and methods are provided for identifying whether a signal is an LTE signal. A signal is received, and a measurement of the signal is computed using control circuitry. A signal parameter corresponding to a system parameter specific to an LTE standard is determined based on the measurement, and whether the signal is an LTE signal is identified based on the signal parameter.

One or more implementations of the present disclosure may provide one or more of the following advantages. For example, the systems and methods of the present disclosure may facilitate prompt and accurate detection as well as classification of interference and may thus help improve the receiver performance of an LTE user equipment. In particular, the accuracy of automatic gain control in the receiver's frontend as well as the performance of synchronization procedures and LTE parameter estimation (e.g., channel estimation, noise variance estimation) may be improved.

BRIEF DESCRIPTION OF THE DRAWINGS

Further features of the disclosure, its nature, and various advantages, will be apparent upon consideration of the following detailed description, taken in conjunction with the accompanying drawings, in which.

DETAILED DESCRIPTION

To provide an overall understanding of the disclosure, certain illustrative embodiments will now be described, including systems and methods for identifying whether a signal is an LTE signal. However, the systems and methods described herein may be adapted and modified as is appropriate for the application being addressed and the systems and methods described herein may be employed in other suitable applications.

Figure 1:
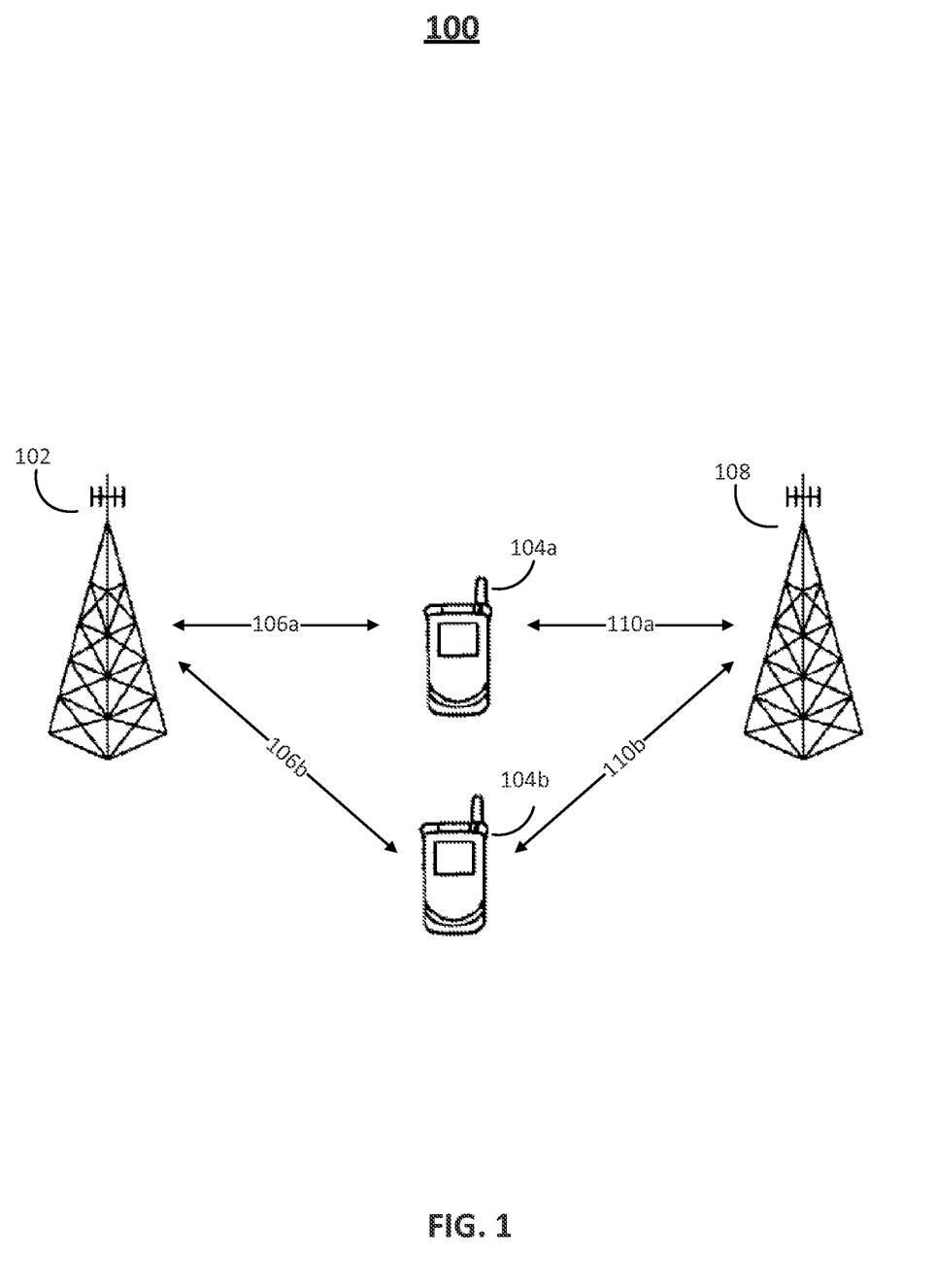
FIG. 1 shows a block diagram of an illustrative communications system, in accordance with an embodiment of the present disclosure.

FIG. 1 shows a simplified diagram of a wireless communications system 100 incorporating embodiments of the present disclosure. Communications system 100 may be a cellular communications systems including a base station 102 that serves two user equipment devices 104a and 104b (generally, user equipment 104). Base station 102 is configured to communicate with user equipment 104 within the communication range of base station 102 via radio signals 106a and 106b (generally, radio signals 106). Within the 3GPP LTE standard, each base station is also known as an "eNB" for "enhanced Node B" or "evolved Node B." The radio communication range of base station 102 corresponds to a cell, which is a geographic area serviced by base station 102.

User equipment 104 may be impacted by interfering signals from other sources, such as from interferer 108. Interferer 108 may be a neighboring base station that services a cell adjacent to the cell corresponding to base station 102. Interferer 104 may also correspond to a wireless transmitter that employs a protocol different from LTE, including but not limited to Wi-Fi or Bluetooth®. Interferer 104 creates interfering signals 110a and 110b (generally, interfering signals 110) that are received by user equipment 104 and may significantly affect the performance of user equipment 104.

Although shown as mobile handsets in FIG. 1, different embodiments of user equipment 104 may include mobile stations, user terminals, or any other suitable wireless device configured to be in communication with the base station 102, based on a communication standard such as the 3GPP LTE protocol.

At any one time, one or more user equipment devices 104 may be in communication with base station 102. Transmission of data, control, or reference signals may occur in a downlink direction, from base station 102 to user equipment 104, or in an uplink direction, from user equipment 104 to base station 102, or both.

The methods and systems described herein provide a technique for user equipment 104 to identify whether interfering signal 110 is an LTE signal.

Figure 2:
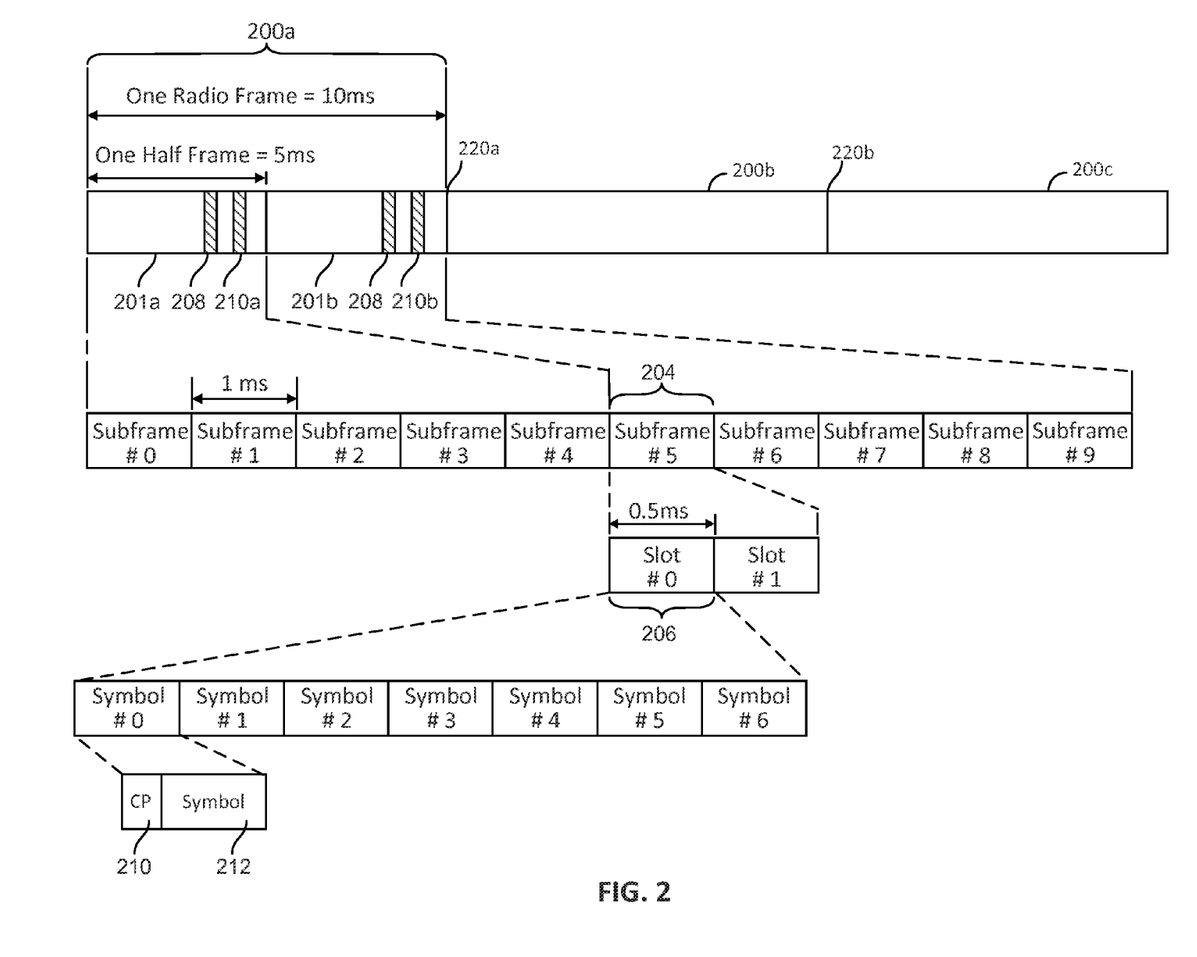
FIG. 2 shows a frame structure of the LTE protocol, in accordance with an embodiment of the present disclosure.

FIG. 2 shows an exemplary structure of a radio frame corresponding to the LTE protocol, in accordance with an embodiment of the present disclosure. In the frame structure as shown, each full "radio frame" 200a-200c (generally, radio frame 200) is 10 milliseconds (ms) long and is separated from the next radio frame by a frame boundary 220. In particular, radio frame 200a is separated from radio frame 200b by frame boundary 220a, and radio frame 200b is separated from radio frame 200c by frame boundary 220b. Radio frame 200a includes two 5 ms half-frames 201a and 201b (generally, half-frame 201). Each half-frame 201 further includes five 1 ms subframes 204, each of which includes two 0.5 ms slots 206. Each slot 206 may contain a predetermined number of symbols using orthogonal frequency-division multiplexing (OFDM). Generally, these symbols will be referred to as OFDM symbols. The illustrative example in FIG. 2 shows a total of seven OFDM symbols.

Each of the OFDM symbols may consist of a symbol portion 212 and a cyclic prefix portion 210. The cyclic prefix portion 210 may repeat an end portion of the symbol portion 212. OFDM receivers frequently utilize a cyclic prefix to mitigate the effect of frequency-selective, multi-path propagation. Effectively, the insertion of a cyclic prefix portion 210 by a wireless transmitter enables a wireless receiver to model the linear convolution associated with the frequency-selective multipath channel as a circular convolution. In turn, this enables a wireless receiver to use simple frequency-domain processing to perform channel estimation and equalization.

The length of cyclic prefix portion 210 may be determined in accordance with the anticipated length of the frequency-selective multi-path channel, such that the length of cyclic prefix portion 210 is at least as long as the dominant multi-path components of the frequency-selective channel. In wireless protocols, such as the LTE protocol, the length of the cyclic prefix portion 210 may be specified. For example, the LTE standard defines a "normal" cyclic prefix duration of approximately 5 μs and an "extended" cyclic prefix of approximately 16.7 μs.

In some embodiments, the cyclic prefix portion 210 may be replaced with a cyclic suffix portion (not shown). In contrast to the cyclic prefix portion, the cyclic suffix portion may be inserted after symbol portion 212 and repeat part of the beginning of the symbol portion. Insertion of a cyclic suffix has similar advantages compared to inserting a cyclic prefix. Although not further discussed explicitly in this disclosure, the embodiments presented herein may be extended to operate based on a cyclic suffix instead of a cyclic prefix.

System and methods described in the present disclosure refer to the frame structure shown in FIG. 2, although one of ordinary skill in the art will understand that other frame structures may be used without departing from the scope of the present disclosure. For example, each frame may be divided into 20 slots (or any other suitable number of slots), where each subframe includes two consecutive slots (or any other suitable number of consecutive slots).

Reference signals may be transmitted in every radio frame 200 and include synchronization reference signals, cell-specific reference signal (CRS), channel state information reference signals (CSI-RS), demodulation reference signals or other types of reference signals. In the example shown in FIG. 2, the same reference signal 208 is transmitted twice per frame.

User equipment 104 may be configured with parameters that allow it to determine the time and frequency locations at which reference signals are embedded in the frame structure 200. Knowledge of these parameters enables the user equipment to perform various measurements, such as to estimate channel state information from base station 102 or other neighboring cells as well as interference from interferer 108 or other sources. Likewise, reference signals may be used to perform demodulation of data transmission from serving base station 102 or to compute channel quality indicator (CQI) measurements.

Although not shown in FIG. 2, it is assumed that frame structure 200 spans a certain bandwidth in frequency. User equipment 104 may detect or be configured with that bandwidth, for example by identifying one of a plurality of possible bandwidth configurations. In order to quantify the impact of an interfering signal 110, user equipment may measure the signal power associated with the bandwidth of frame structure 200 and compare it to the power of signals received outside that frequency range. This measurement may be performed through filtering, e.g., by measuring the total signal power of the received signal before and after low-pass filtering.

Figure 3:
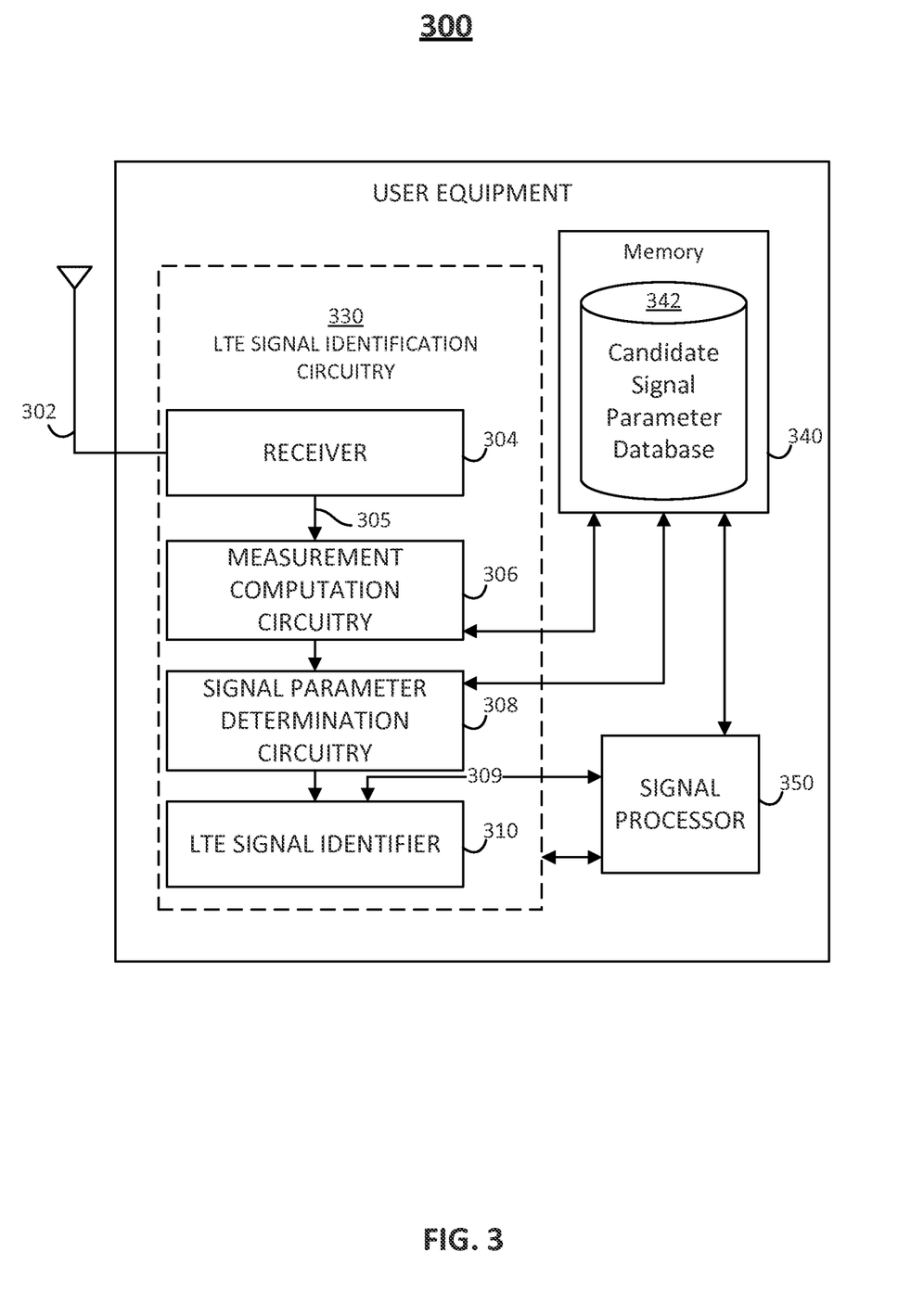
FIG. 3 shows an illustrative block diagram of a user equipment, in accordance with an embodiment of the present disclosure.

FIG. 3 shows an example block diagram of user equipment 300, which may be a more detailed representation of user equipment 104 of FIG. 1, in accordance with an embodiment of the present disclosure. User equipment 300 includes an antenna 302 for wireless transmission or reception, an LTE signal identification circuitry 330, a memory 340, and a processor 350. User equipment 300 may optionally include a user input and output interface, a power supply, and any other suitable digital or analog circuitry necessary for reliable communication and data storage (not shown).

Antenna 302 receives signals such as radio signals 106 from one or more base stations and provides the received signal to LTE signal identification circuitry 330 for signal identification. In some embodiments, user equipment 300 may include more than one antenna. For example, a dual-antenna user equipment 300 may employ any appropriate multiple-input multiple-output (MIMO) communication schemes to improve data throughput, spectral efficiency, link reliability, or other performance parameters.

LTE signal identification circuitry 330 may be configured to perform synchronization and reception processes (such as acquisition of synchronization reference signals, for example) to estimate and identify frame boundaries and symbol boundaries associated with frame structure 200. This synchronization procedure may include identifying a carrier frequency offset and other time or frequency parameters that may be necessary for channel estimation and data reception processes. In what follows, memory 340 and LTE signal identification circuitry 330 are described in detail in relation to LTE signal identification.

Memory 340 includes a candidate signal parameter database 342, which stores parameters that may be used to perform measurements of and test various hypotheses about an interfering signal 110. These parameters may include the length of cyclic prefix portion 210 associated with frame structure 200, the bandwidth associated with frame structure 200, and parameters associated with reference signals embedded into frame structure 200. For example, the time and frequency location of reference signals used for channel quality indication (CQI) measurement or radio link monitoring (RLM) purposes may be stored. In some embodiments, the time and frequency locations of these reference signals may not need to be stored explicitly in the memory but may instead be derived from system parameters. For example, in the LTE protocol, base station 102 may be associated with a physical cell identifier (PCI), a number in the range from 0 to 503, from which the time and frequency locations in the frame structure 200 can be derived. The time and frequency locations of the reference signals may also be derived, alternatively or additionally, from configuration parameters that are received by user equipment 300 through various control channels. These configuration parameters may be stored by user equipment 300 in memory 340 upon reception.

LTE signal identification circuitry 330 includes a receiver 304, a measurement computation circuitry 306, signal parameter determination circuitry 308, and an LTE signal identifier 310. Candidate signal parameters stored in memory 340 are accessed by LTE signal identification circuitry 330 to compute one or more measurements. Alternatively or additionally, signal parameter determination circuitry 308 may access the stored candidate signal parameters in memory 340 to determine signal parameters based at least in part on the candidate signal parameters and the computed measurements.

Receiver 304 receives a radio signal 106 over antenna 302. In some embodiments of the present disclosure, receiver 304 performs any one or more of amplifying, demodulating, sampling, down-sampling, filtering, descrambling, or other processing steps before the resulting received signal 305 is sent to measurement computation circuitry 306. When user equipment 300 includes more than one antenna, a separate copy of the radio signal 106 may be received on each antenna. Signals received on individual antennas may be processed separately or jointly by receiver 304.

In some embodiments, receiver 304 may convert one or more portions of radio signal 106 into the frequency domain, if such a transform has not been previously performed. One or more subcarriers may be removed from the frequency-transformed signal if it is known a priori that these subcarriers are either not used by base station 102 or not necessary for the measurement and determination steps described below. For example, in some embodiments, a central DC subcarrier may be removed.

Measurement computation circuitry 306 computes one or more measurements based on the received signal including but not limited to RLM measurements, CQI measurements, front-end power measurements, autocorrelation measurements, or channel delay measurements. Measurement computation circuitry may also receive an indication that interference from other components of user equipment 300 is present. For example, an internal interference indicator 309 may be received from signal processor 350. In some embodiments of the present disclosure, user equipment 300 may compute a plurality of measurements and each of the plurality of measurements may be used by signal parameter determination circuitry 308 to determine signal parameters.

In some embodiments of the present disclosure, measurement computation circuitry 306 may compute an RLM measurement. RLM measurements may be performed for each of a plurality of base stations, such as serving base station 102 and other neighboring base stations. Each of the plurality of RLM measurements may be based at least in part on a reference signal corresponding to the base station for which the RLM measurement is performed (for example, the cell-specific reference signal (CRS) in the LTE protocol). Each of the plurality of RLM measurements may include determining the time and frequency location of the reference signal associated with the base station, processing the received symbols associated with the reference signal transmission, and computing a signal strength metric based on the received symbols. The signal strength metric may reflect the received power of the signal received from the base station, or the metric may further be normalized by a noise power corresponding to other signals received by user equipment 300. In the latter case, the metric may reflect a signal-to-noise ratio corresponding to a signal transmission from the base station.

In some embodiments of the present disclosure, measurement computation circuitry 306 may compute a CQI measurement. The CQI measurement may be computed in a conceptually similar fashion as the RLM measurement and may include determining the time and frequency location of a reference signal in frame structure 200. However, the CQI measurement may be based on a different reference signal or reference signals than that used for the RLM measurement. Moreover, instead of computing a metric associated with a signal strength or signal-to-noise ratio associated with a reference signal, the CQI measurement may reflect which of a plurality of modulation and coding schemes (MCS) could be supported by a hypothetical transmission from the base station to the user equipment. This determination may require the user equipment 300 to make an assumption about the transmission scheme used for the transmission. In some embodiments, this assumption may be part of configuration parameters signaled by base station 102 to the user equipment, or it may be specified as part of a protocol.

When user equipment 300 includes more than one antenna 302 and if a MIMO transmission scheme is used for communication link 106, the CQI measurement computation may further require the user equipment to make an assumption about a precoder matrix and a transmission rank used by the network. The user equipment may determine the value of the precoding matrix or the rank based on configuration parameters or the user equipment may determine recommended values of the precoder matrix and the transmission rank as part of the CQI measurement. For example, in the LTE protocol, the CQI measurement may be transmitted by user equipment 300 to base station 102 and may be accompanied by a precoding matrix indicator (PMI), which reflects a precoding matrix assumption, and a rank indicator (RI) that reflects an assumption about the transmission rank.

Interfering signal 110 may be transmitted by an LTE base station, and therefore correspond to an LTE signal, or it may be transmitted by another type of interferer, such as a Wi-Fi access point or a Bluetooth® transmitter. If the interfering signal 110 is an LTE signal, the RLM and CQI measurements described in the preceding paragraphs may yield an accurate estimate of RLM and CQI parameters based on the reference signal transmissions. However, if the interfering signal is not an LTE signal, then the RLM or CQI reference signals may not be present and it may not be possible to compute an accurate RLM or CQI measurements. To address this issue, in some embodiments of the present disclosure, at least one of the RLM or CQI measurements may include a hypothesis test of whether a reference signal is present at the candidate locations retrieved from memory 340. For example, user equipment 300 may determine whether a reference signal is present at the time and frequency locations determined based on the candidate signal parameters retrieved from memory 340. Additionally or alternatively, user equipment 300 may compute RLM or CQI measurements to determine whether the measurement result falls within an expected range consistent with the LTE protocol or determined from other parameters of the received signal. The outcome of this hypothesis test may be sent to signal parameter determination circuitry 308, either separately or jointly with the RLM and CQI measurement results.

In some embodiments of the present disclosure, the measurement computation circuitry 306 may compute a front-end power measurement. The front-end power measurement may be based on comparing the signal power before and after low-pass filtering is performed at the receiver. Prior to low-pass filtering, the received signal may contain signal components that fall outside the bandwidth corresponding to frame structure 200, and these signal components may be either removed or partially suppressed by the low-pass filtering. Therefore, comparing the signal power before and after low-pass filtering gives an indication of the signal power associated with interfering signal components outside the bandwidth associated with frame structure 200.

In some embodiments of the present disclosure, the measurement computation circuitry 306 may compute a peak-to-average power ratio measurement of the received signal. The peak-to-average ratio may be computed for a certain time period of the received signal by dividing the maximum absolute value of the received signal within the time period by an average value of the received signal during the same time period. For example, the average value may correspond to a root-mean-square (RMS) value that is obtained by averaging the squared absolute values of the received signal values within the time period and computing the square root of said average. Other metrics that quantify the average value of the received signal during the time period may be used instead of the RMS value. The peak-to-average power ratio may also be known as the Crest factor of the signal, because it indicates how "extreme" the peaks of a signal are in relation to its average value.

Various modulation schemes exhibit different typical values of the peak-to-average power ratio. For example, OFDM based modulation schemes, as used in the LTE protocol, are generally associated with a high value of the peak-to-average power ratio. In contrast, single-carrier signals, such as used by the Bluetooth® protocol, are associated with a low value of the peak-to-average power ratio. Therefore, the peak-to-average power measurements may be used, at least in part, to identify whether interfering signal 110 is an LTE signal.

In some embodiments of the present disclosure, measurement computation circuitry 306 may compute an LTE signal autocorrelation measurement. Measurement computation circuitry 306 may compute the LTE signal autocorrelation measurement by correlating the cyclic prefix portion of the signal corresponding to an OFDM symbol with the symbol portion of the same OFDM symbol. If the received signal 305 corresponds to an LTE signal, then the cyclic prefix portion of the received signal corresponds to a repetition of the end of the symbol portion of the OFDM symbol. Due to the repetition, a received signal that is based on frame structure 200 may exhibit a high correlation of these two portions and may therefore correspond to a large value of the LTE signal auto-correlation measure. In contrast, a signal that is not OFDM modulated or that is associated with a cyclic prefix portion of a different length would exhibit a comparably low value of the correlation metric. Therefore, the LTE signal autocorrelation measurement may be used, at least in part, to determine whether the interfering signal 110 is an LTE signal.

User equipment 300 may perform the LTE signal autocorrelation measurement by retrieving a candidate length of the cyclic prefix portion from candidate signal parameter database 342. In some embodiments, multiple LTE signal autocorrelation measurements may be performed, each of which is associated with a different candidate length of the cyclic prefix portion. For example, separate measurements may be computed for the normal and extended cyclic prefix lengths defined in the LTE protocol. Additional LTE signal autocorrelation measurements may be computed for cyclic prefix lengths associated with other transmission protocols, such as various Wi-Fi protocols.

In another embodiment of the present disclosure, measurement computation circuitry 306 may compute a measurement of the channel impulse response (CIR) of the received signal. The signals associated with communication links 106 and 110 correspond to different transmitters and are therefore received over different propagation channels. The characteristics of these different propagation channels are generally different, for example, in terms of their CIR, the power-average channel delay, etc. Generally, the channel characteristics do not vary quickly in time and a sudden change of these characteristics may therefore indicate that the source of the interfering signal has changed. For example, a change in these characteristics may foreshadow the appearance an interfering signal associated with a strong interferer.

Measurement computation circuitry 306 may compute a measurement of the CIR associated with the received signals based on one or more reference signals embedded in frame structure 200. Similar to the computation of RLM or CQI measurements, measurement computation circuitry 306 may access parameters associated with the one or more reference signals from candidate signal parameter database in memory 304. The time and frequency location of the reference signals may be determined, and a first reference signal occurrence may be used to estimate a first CIR of the received signal. Subsequently, measurement computation circuitry 306 may compute a second CIR estimate based on a second reference signal occurrence. The first CIR estimate and the second CIR estimate may then be compared and if they differ substantially, measurement computation circuitry 306 may determine that a change of the propagation characteristics has occurred.

The comparison between the first CIR and the second CIR may be performed in various ways. For example, the power-average channel delay (or average delay spread) may be computed for the first CIR and the second CIR, respectively to obtain a first power-average channel delay and a second power-average channel delay. If the first and the second power-average channel delay differ substantially, it may be determined that a change of propagation characteristics has occurred. Alternatively, the first CIR and the second CIR may be compared in other ways, for example, by considering the various propagation paths or taps of the CIR separately or jointly.

Signal parameter determination circuitry 308 determines one or more signal parameters corresponding to the one or more measurements computed by measurement computation circuitry 306. The signal parameters may correspond to system parameters specific to an LTE standard. For example, the determined signal parameters include but are not limited to RLM or CQI values, front-end power measurements, peak-to-average power measurements, LTE signal autocorrelation measurements, and channel delay measurements. Signal parameter determination circuitry may determine signal parameters for only a subset of the measurements computed by measurement computation circuitry 306. For example, when a measurement is deemed unreliable or otherwise unsuitable for identifying whether the interfering signal is an LTE signal, signal parameter determination circuitry 308 may not associate a signal parameter to the computed measurement.

In addition to signal parameters, signal parameter determination circuitry 308 may also determine a measure of accuracy associated with each of the determined signal parameters. For example, signal parameter identification circuitry 308 may determine whether the determined signal parameters fall within a range that is consistent with the type of the measurement. The determination of whether the computed measurement falls within the range may be passed on to the LTE signal identifier 310 together with the computed measurement as will be discussed in more detail below.

In some embodiments, signal parameter determination circuitry 308 may keep track of previously determined signal parameters, for example by storing them in memory 340. When determining signal parameters based on a newly computed measurement, the previously determined values may be retrieved from memory 340 and averaged with the newly determined parameter to average out measurement noise that may be present in the measurement. Alternatively, if a significant difference is detected between the newly determined signal parameter and previously determined signal parameters, signal parameter determination circuitry 308 may identify that the newly computed is unreliable. This identification may be passed on to the LTE signal identifier 310 or the newly computed measurement may be discarded.

LTE signal identifier 310 identifies whether the interfering signal is an LTE signal based on the determined signal parameters. The identification may be based on all or a subset of the signal parameters determined by signal parameter determination circuitry 308. If multiple signal parameters are used to make the identification, the identification may be made jointly based on the multiple parameters and may include attributing weights to the determined signal parameters. The weights may take into account that some measurements are generally more reliable than others in identifying an LTE signal, such as when a first determined signal parameter serves as a better indication of whether a signal is an LTE signal than a second parameter. However, the weights may also take into account the reliability of a specific signal parameter determined from a specific measurement. For example, when it is known that a current measurement is unreliable, then the weights associated with this signal parameter may be decreased accordingly.

In some embodiments of the present disclosure, LTE signal identifier 310 may identify whether a signal is an LTE signal by comparing a determined signal parameter to a predetermined threshold. The predetermined threshold may be permanently stored in a component of user equipment of 300, or it may be part of memory 342 and updated based on the received signals or based on configuration parameters received by the network.

LTE signal identification circuitry 330 and other circuits (not shown) in user equipment 300 may include any suitable communications circuitry (e.g., power amplifier, analog to digital converter, digital filter) (not shown) coupled to antenna 302 to receive and process incoming data from a base station (e.g., base station 102 of FIG. 1). LTE signal identification circuitry 330 may include a signal processor or multiple processors. Each processor may be general purpose or application specific and may be implemented as a stand-alone integrated circuitry or as part of a larger system. Any suitable variation of user equipment 300 shown in FIG. 3 may be used to communicate with other wireless devices by receiving, transmitting, processing, and storing data. For example, additional processors such as signal processor 350 may be used to perform data processing functions other than LTE signal identification, and may be used to control user input/output and system processes run by user equipment 300. Processor 350 may communicate with any component of LTE signal identification circuitry 330 and memory 340. Furthermore, memory 340 may be used to store other data and data structures in addition to candidate signal parameters 342 shown in FIG. 3. In general, memory 340 may include any suitable storage device or combination of storage devices such as hard disk drives, solid state memory, PAM, or ROM.

Figure 4:
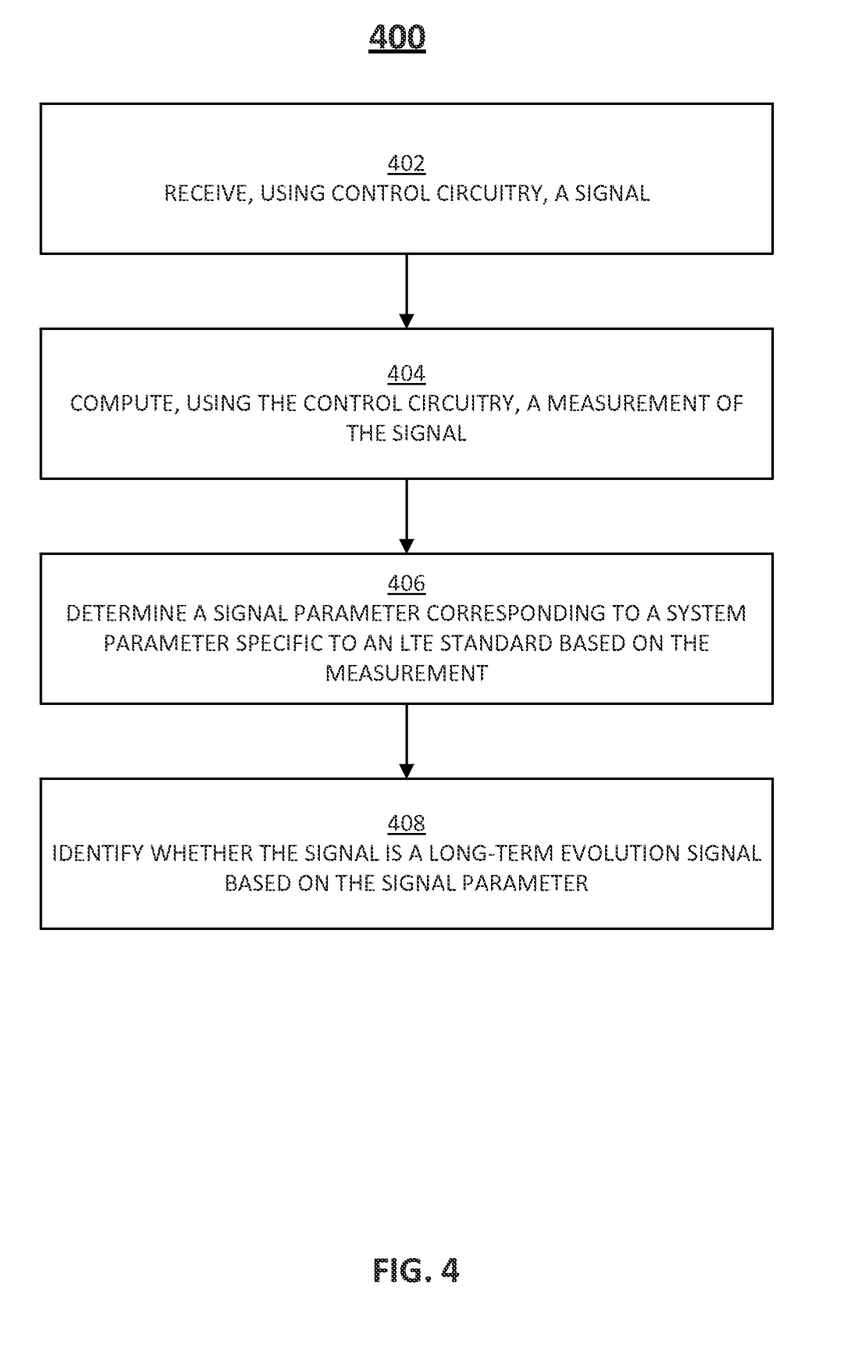
FIG. 4 shows a flow diagram of a high-level process for identifying whether a signal is an LTE signal, in accordance with an embodiment of the present disclosure.

FIG. 4 is a high-level flow chart of a process 400 for identifying whether a signal is an LTE signal, in accordance with an embodiment of the present disclosure. User equipment 300 may execute process 400 by receiving, at a receiver, a signal from an interferer (402). Process 400 further includes computing, using control circuitry, a measurement of the signal (404), and determining a signal parameter corresponding to a system parameter specific to an LTE standard based on the measurement (406). Process 400 further includes identifying whether a signal is an LTE signal based on the signal parameter (408).

At 402, user equipment 300 receives a signal from an interferer using control circuitry. As is described in relation to FIG. 1, the received signal may be transmitted by an interferer 108, such as a neighboring base station or another wireless transmitter, such as a Wi-Fi access point, a Bluetooth transmitter, or a different type of transmitter. If the received signal is an LTE signal, the received signal may include one or more radio frames 200 as well as one or more occurrences of reference signals 208.

Exemplary processes of step 402 include demodulation, amplification, sampling, down-sampling, filtering, and any other suitable signal processing and digital communication techniques. Sampling may occur at predetermined frequencies or predetermined periods, continuously or non-continuously, uniformly or non-uniformly.

At 404, user equipment 300 computes one or measurements of the signal using the control circuitry. As is discussed in relation to FIG. 3, the one or more measurements may include but are not limited to RLM measurements, CQI measurements, front-end power measurements, peak-to-average power measurements, LTE signal autocorrelation measurements, and channel delay measurements. The one or more measurements may be processed separately or jointly. For example, if a first and a second measurement share similar processing steps, as may be the case for RRM and CQI measurements, then the first and the second measurement may be processed jointly in order to reduce computation complexity.

At 406, user equipment 300 determines one or more signal parameters corresponding to one or more system parameters specific to an LTE standard based on the one or more measurements computed in step 404. Signal parameters may be determined only on a subset of the computed measurements, for example, in case some of the measurements are deemed unreliable or otherwise ill-suited for identifying whether the signal is an LTE signal.

In some embodiments of the present disclosure, the determined signal parameters may be stored in memory 340 such as to retain a history of signal parameters determined from previous measurements. Instead of determining signal parameters only based on the current measurements, the stored signal parameters determined from previous measurements may be updated based on the newly computed measurements. This may improve the accuracy of the determined signal parameters because potential inaccuracies associated with each of the determined signal parameters may be reduced through the averaging process.

In some embodiments of the present disclosure, user equipment 300 may utilize the determined signal parameters for purposes other than identifying whether a received signal is an LTE signal. For example, the determined signal parameters may be used to perform one or more of automatic front-end gain control, synchronization, channel estimation, and noise estimation. The determined signal parameters may include a signal type, a signal strength, an operating band of the signal, a bandwidth of the signal, etc.

At 408, user equipment 300 identifies whether the signal is an LTE signal based on the signal parameters. As is described in relation to FIG. 3, the identification may be based on comparing the signal parameter to a predefined threshold. If more than one signal parameter is used as part of the identification step, then each of the plurality of parameters may be compared to a respective predefined threshold. The results of the comparison, performed for each signal parameter, may be averaged to perform the identification. For example, a majority rule could be used to perform the identification but other decision rules may also be considered.

In some embodiments of the present disclosure, if more than one signal parameter is used, a weight may be associated with each of the one or more signal parameters. As is described in relation to FIG. 3, the weights may reflect that one signal parameter is generally better suited to identify a signal as an LTE signal compared to another. Additionally or alternatively, the weights may also reflect that a signal parameter derived from a specific measurement is either more or less reliable, for example, because the specific measurement was associated with a larger or smaller degree of accuracy than normal.

Figure 5:
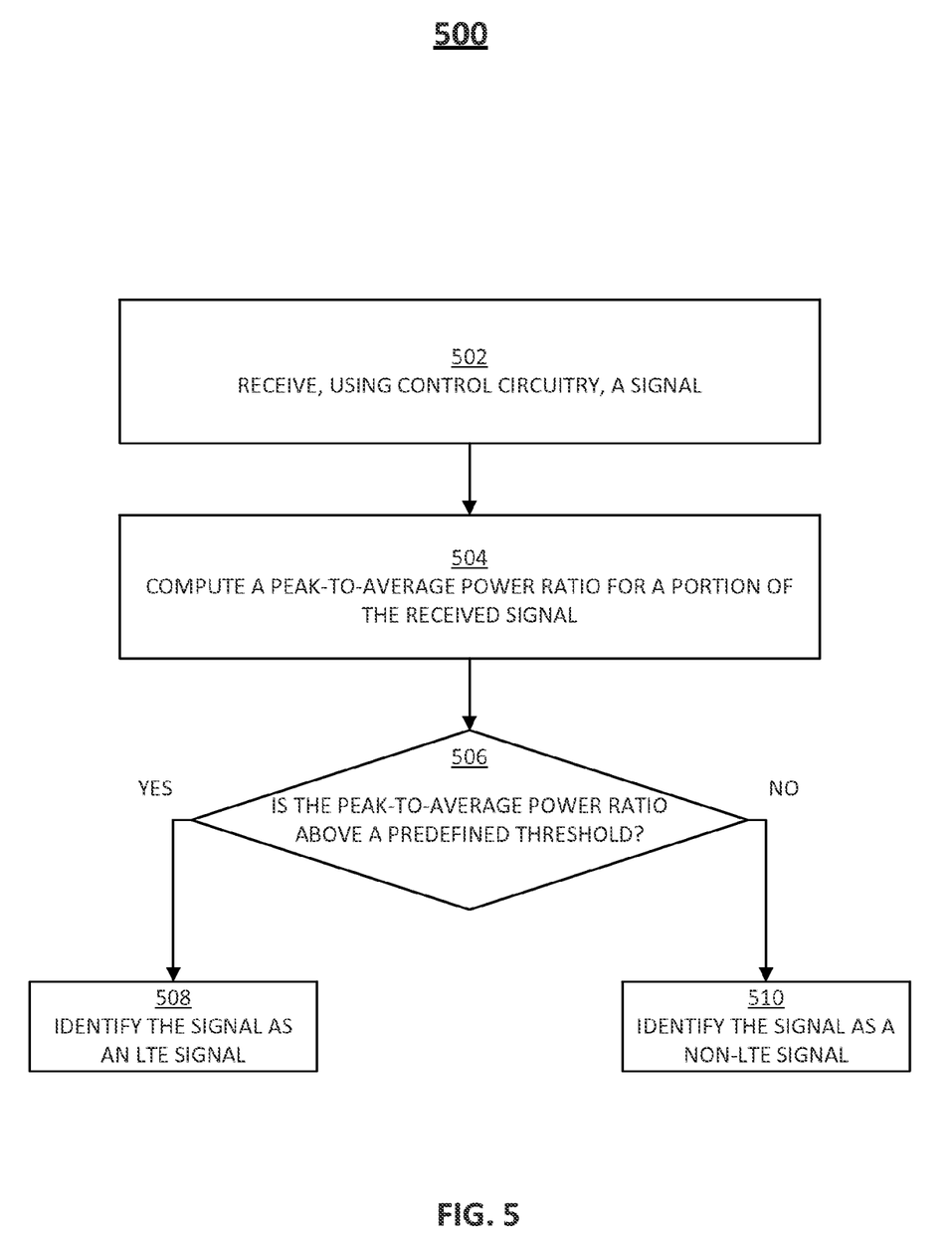
FIG. 5 shows a flow diagram of a process for identifying whether a signal is an LTE signal based on a peak-to-average power ratio, in accordance with an embodiment of the present disclosure.

FIG. 5 is a flow diagram of process 500 for identifying whether a signal is an LTE signal, in accordance with an embodiment of the present disclosure. LTE signal identification circuitry 330 may execute process 500 by receiving a signal using control circuitry (502) and computing a peak-to-average power ratio for a portion of the received signal (504). Process 500 compares the peak-to-average power ratio to a predefined threshold (506) and identifies the signal as an LTE signal if the peak-to-average power ratio is above the threshold (508) and identifies the signal as a non-LTE signal if the peak-to-average power ratio is below a predefined threshold (510).

At 502, LTE signal identification circuitry 330 receives a signal using control circuitry. As is described in relation to FIG. 4, exemplary processes may include demodulation, amplification, sampling, down-sampling, filtering, and any other suitable signal processing and digital communication techniques. Sampling may occur at predetermined frequencies or predetermined periods, continuously or non-continuously, uniformly or non-uniformly.

At 504, a peak-to-average power ratio is computed for a portion of the received signal. As is described in relation to FIG. 3, the peak-to-average power ratio is computed by determining the peak absolute value within the portion of the signal, and dividing it by a measure of the average signal value within the portion of the signal.

At 506, the computed peak-to-average power ratio is compared to a predefined threshold. If the computed value of the peak-to-average power ratio is above a threshold, then the signal is identified as an LTE signal (at 508); otherwise the signal is identified as a non-LTE signal (at 510).

Figure 6:
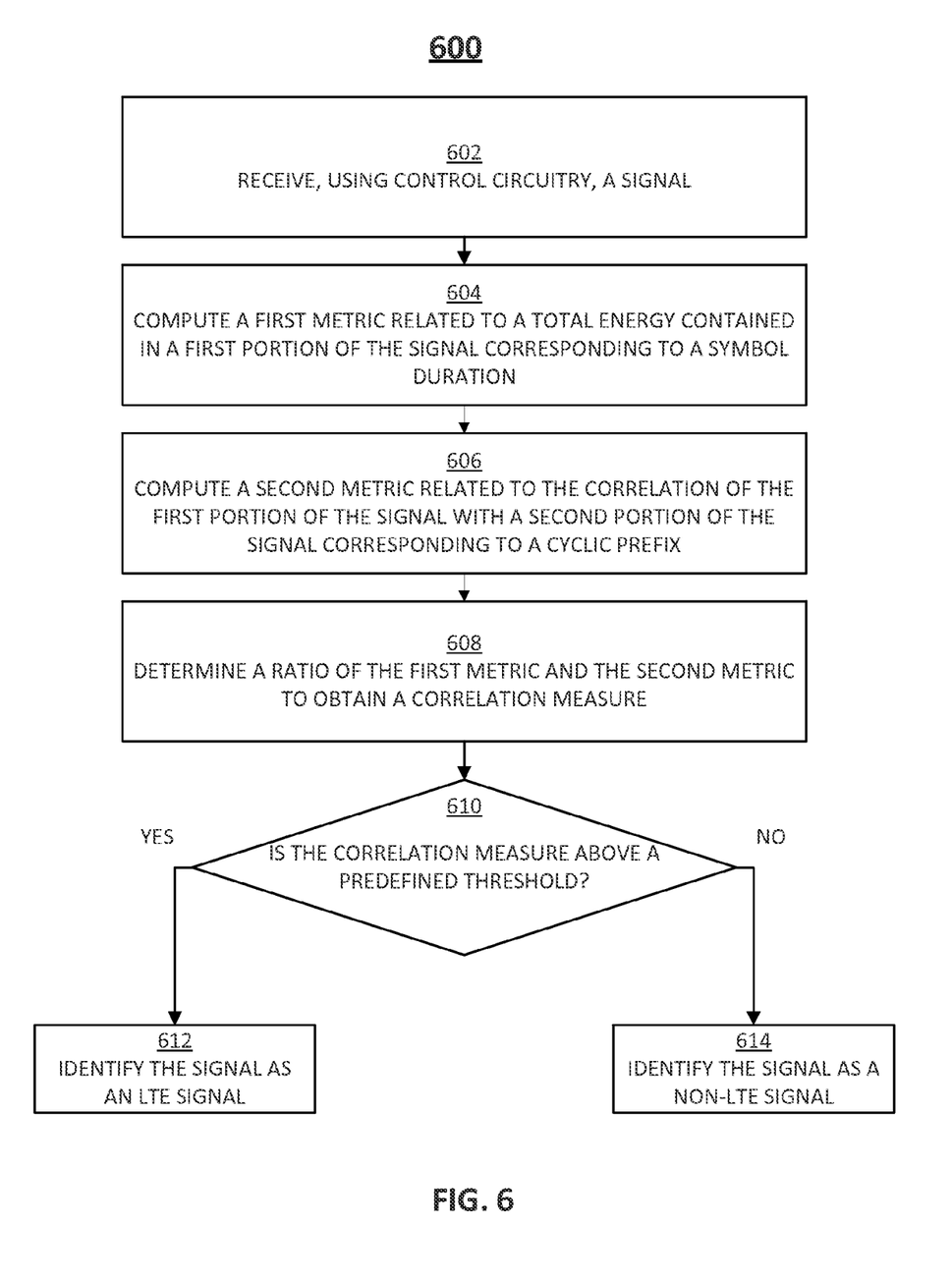
FIG. 6 shows a flow diagram of a process for identifying whether a signal is an LTE signal based on a correlation measure, in accordance with an embodiment of the present disclosure.

FIG. 6 is a flow diagram of a process 600 for identifying whether a signal is an LTE signal, in accordance with an embodiment of the present disclosure. LTE signal identification circuitry 330 executes process 600 by receiving a signal using control circuitry (602). It then computes a first metric related to a total energy contained in a first portion of the signal corresponding to a symbol duration (604) and a second metric related to the correlation of the first portion of the signal with a second portion of the signal corresponding to a cyclic prefix (608). LTE signal identification circuitry 330 then determines a ratio of the first metric and the second metric to obtain a correlation measure (608) and compares the correlation measure to a predefined threshold (610). If the correlation measure is above the predefined threshold, the signal is identified as an LTE signal (612); otherwise it is identified as a non-LTE signal (614).

At 602, LTE signal identification circuitry 330 receives a signal using control circuitry. As is described in relation to FIG. 4, exemplary processes include demodulation, amplification, sampling, down-sampling, filtering, and any other suitable signal processing and digital communication techniques. Sampling may occur at predetermined frequencies or predetermined periods, continuously or non-continuously, uniformly or non-uniformly.

At 604, a first metric related to a total energy contained in the a first portion of the symbol corresponding to a symbol duration is computed. The first metric may give an indication of the power associated with the received signal.

At 606, a second metric related to a correlation of the first portion of the signal with a second portion of the signal, corresponding to the cyclic prefix, is computed. The second metric may give an indication of whether the second portion of the signal corresponds to cyclic prefix portion 210 in accordance with a hypothesis that the received signal is an LTE signal. Specifically, if the received signal is an LTE signal, then the second portion of the signal will correspond to a cyclic prefix, leading to large correlation and thus a large second metric. Conversely, if the received signal is not an LTE signal, then the second portion of the signal will not correspond to a cyclic prefix, leading to small correlation and thus a small second metric.

At 608, a ratio of the first metric and the second metric is computed to obtain a correlation measure. Computing the ratio of the first metric and the second metric normalizes the correlation measure according to the total energy contained in the OFDM symbol. Due to this normalization, the correlation measure may be largely independent of whether the received signal has large or small signal strength. This reduces the variance of the measurement value and facilitates comparing the computed measurement to a predefined threshold, as the threshold value can be chosen independently of the strength of the received signal.

At 610, the correlation measure is compared to a predefined threshold. If the correlation measure is above the predefined threshold, the signal is identified as an LTE signal (612); otherwise it is identified as a non-LTE signal (614).

Figure 7:
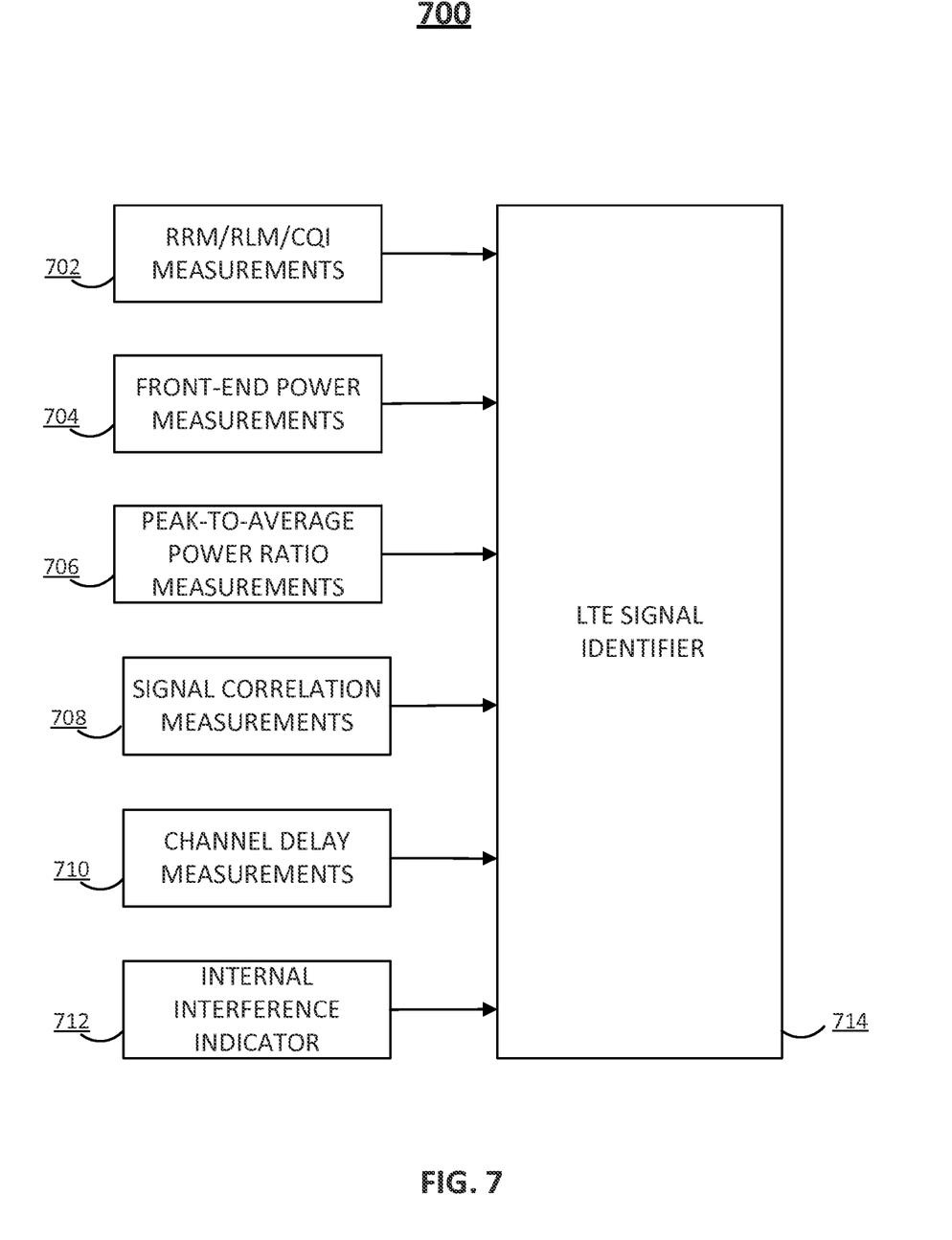
FIG. 7 shows a block diagram of an LTE signal identifier, in accordance with an embodiment of the present disclosure.

FIG. 7 is a block diagram of an LTE signal identifier, in accordance with an embodiment of the present disclosure. As is described in relation to FIG. 3, LTE signal identifier 714 may receive one or more inputs corresponding to signal parameters determined from one or more computed measurements. These measurements include but are not limited to RLM/CQI measurements 702, front-end power measurements 704, peak-to-average power ratio measurements 706, signal correlation measurements 708, and channel delay measurements 710. In addition, LTE signal identifier 714 may receive an internal interference indicator 712 from internal hardware of user equipment 300. The internal interference indicator may provide an indication of whether other components of user equipment 300 are active that may cause interference to receiver 304. Such internal interference may be created by wireless transceivers associated with protocols different from the one associated with receiver 304. For example, in one embodiment, user equipment 300 may concurrently support both the LTE protocol and a Wi-Fi protocol. In this case, Wi-Fi transmissions may cause interference to receiver 304 because both are implemented in close proximity on the same device.

In some embodiments of the present disclosure, LTE signal identifier 714 may identify whether the received signal is an LTE signal by combining measurements 702-712. One or more signal parameters may be derived from the measurements, and the one or more signal parameters may be used, jointly or separately, to perform the identification. For example, signal parameters may correspond to system parameters specific to an LTE standard. As is described in relation to FIG. 4, weights may be associated with the signal parameters to reflect a degree of accuracy or reliability associated with them. These weights may be used by LTE signal identifier 714 to perform the identification in a way that gives less weight to signal parameters with relatively low reliability and more weight to signal parameters with relatively high reliability.

In some embodiments of the present disclosure, the signal parameters determined from the measurements include but are not limited to signal type, signal strength, an operating band of the signal, and a bandwidth of the signal. The signal type may include the type of wireless protocol associated with the signal, the modulation and coding scheme associated with the signal, and similar signal properties.

Figure 8:
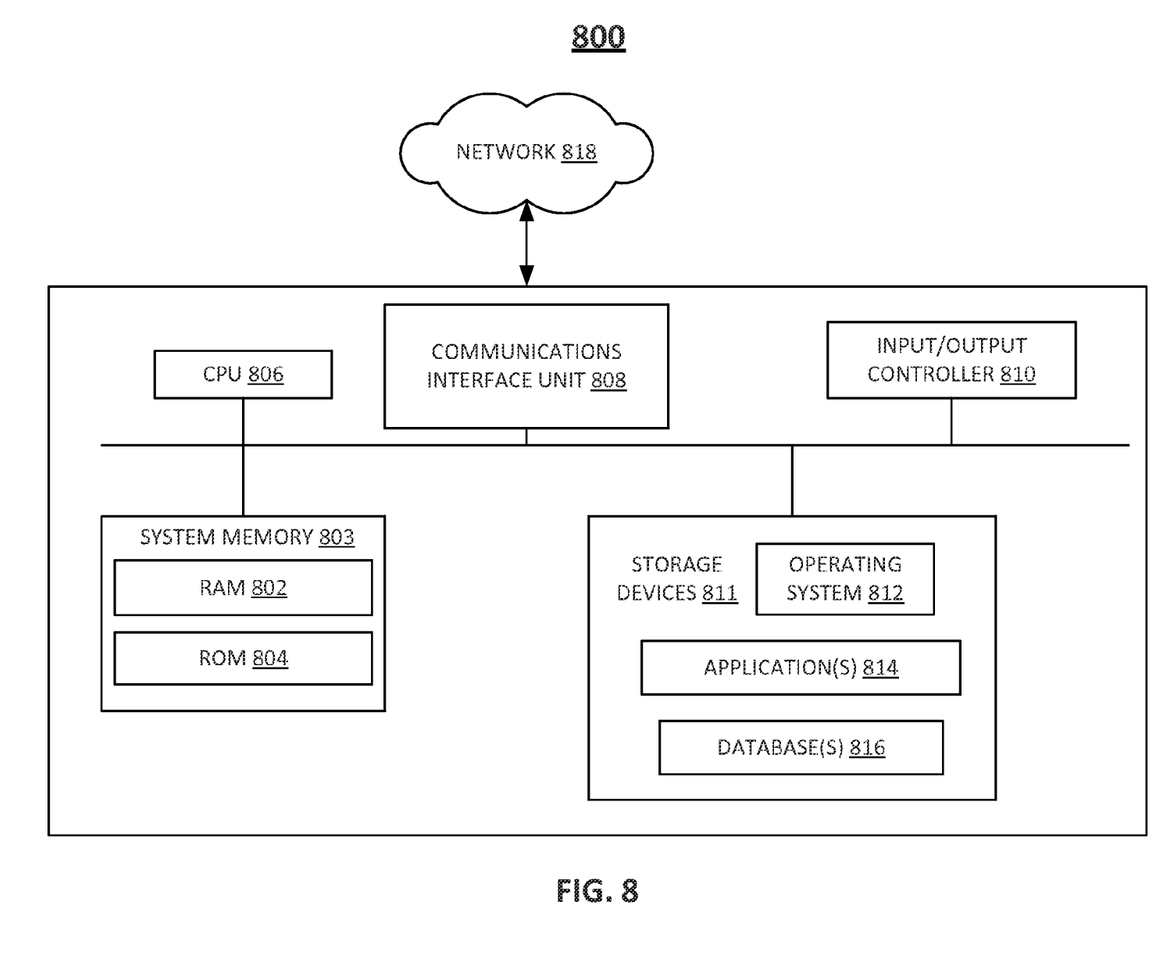
FIG. 8 shows a block diagram of a computing device, for performing any of the processes described herein, in accordance with an embodiment of the present disclosure.

FIG. 8 is a block diagram 800 of a computing device, such as any of the components of the system of FIG. 3, for performing any of the processes described herein, in accordance with an embodiment of the disclosure. Each of the components of these systems may be implemented on one or more computing devices 800. In certain aspects, a plurality of the components of these systems may be included within one computing device 800. In certain embodiments, a component and a storage device 811 may be implemented across several computing devices 800.

The computing device 800 includes at least one communications interface unit 808, an input/output controller 810, system memory 803, and one or more data storage devices 811. The system memory 803 includes at least one random access memory (RAM 802) and at least one read-only memory (ROM 804). All of these elements are in communication with a central processing unit (CPU 806) to facilitate the operation of the computing device 800. The computing device 800 may be configured in many different ways. For example, the computing device 800 may be a conventional standalone computer or alternatively, the functions of computing device 800 may be distributed across multiple computer systems and architectures. In FIG. 8, the computing device 800 is linked, via network 818 or local network, to other servers or systems.

The computing device 800 may be configured in a distributed architecture, wherein databases and processors are housed in separate units or locations. Some units perform primary processing functions and contain at a minimum a general controller or a processor and a system memory 803. In distributed architecture embodiments, each of these units may be attached via the communications interface unit 808 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 806 includes a processor, such as one or more conventional microprocessors and one or more supplementary co-processors such as math co-processors for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers or client terminals.

The CPU 806 is also in communication with the data storage device 811. The data storage device 811 may include an appropriate combination of magnetic, optical or semiconductor memory, and may include, for example, RAM 802, ROM 804, flash drive, an optical disc such as a compact disc or a hard disk or drive. The CPU 806 and the data storage device 811 each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 806 may be connected to the data storage device 811 via the communications interface unit 808. The CPU 806 may be configured to perform one or more particular processing functions.

The data storage device 811 may store, for example, (i) an operating system 812 for the computing device 800; (ii) one or more applications 814 (e.g., computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program.

The operating system 812 and applications 814 may be stored, for example, in a compressed, an uncompiled and an encrypted format, and may include computer program code. The instructions of the program may be read into a main memory of the processor from a computer-readable medium other than the data storage device 811, such as from the ROM 804 or from the RAM 802. While execution of sequences of instructions in the program causes the CPU 806 to perform the process steps described herein, hard-wired circuitry may be used in place of, or in combination with, software instructions for embodiment of the processes of the present disclosure. Thus, the systems and methods described are not limited to any specific combination of hardware and software.

Suitable computer program code may be provided for performing one or more functions in relation to synchronization signal acquisition as described herein. The program also may include program elements such as an operating system 812, a database management system and "device drivers" that allow the processor to interface with computer peripheral devices (e.g., a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer may read.

Various forms of computer readable media may be involved in carrying one or more sequences of one or more instructions to the CPU 806 (or any other processor of a device described herein) for execution. For example, the instructions may initially be borne on a magnetic disk of a remote computer (not shown). The remote computer may load the instructions into its dynamic memory and send the instructions over an Ethernet connection, cable line, or even telephone line using a modem. A communications device local to a computing device 800 (e.g., a server) may receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Various aspects of the present disclosure further relate to one or more of the following clauses. In an aspect of the present disclosure, a method is provided for identifying whether a signal is an LTE signal. A signal is received and a measurement of the signal is computed using control circuitry. A signal parameter corresponding to a system parameter specific to an LTE standard is determined based on the measurement, and whether the signal is an LTE signal is identified based on the signal parameter.

In some implementations, the signal parameter may correspond to a peak-to-average power ratio for a portion of the received signal, and identifying whether the signal is an LTE signal may be based on determining whether the peak-to-average power ratio is above a predefined threshold.

In some implementations, the signal parameter may be a correlation measure. The correlation measure may be computed based on a first metric related to a total energy contained in a first portion of the signal corresponding to a symbol duration, and a second metric related to a correlation of the first portion of the signal with a second portion of the signal corresponding to a cyclic prefix. A ratio of the first metric and the second metric may be determined to obtain a correlation metric, and whether the signal is an LTE signal may be identified based on comparing the correlation measure to a predefined threshold.

In some implementations, the signal parameter may be used, at least in part, to preform one or more of automatic front-end gain control, synchronization, channel estimation, and noise-variance estimation. In some implementations, the measurement may include one of a channel quality measurement, a radio-link monitoring measurement, and a determination of whether the received signal is of internal or external origin.

In some implementations, the signal parameter may include one of a signal type, a signal strength, an operating band of the signal, and a bandwidth of the signal. In some implementations, the received signal may be one of an LTE signal, a Wi-Fi signal, and a Bluetooth signal.

In some implementations, the measurement may include a plurality of measurements, and one or more signal parameters may be determined for each of the plurality of measurements. Moreover, whether the signal is an LTE signal may be identified based on combining the one or more signal parameters corresponding to each of the plurality of measurements. In some implementations, a weight may be assigned to the one or more signal parameters corresponding to each of the plurality of measurements and the one or more signal parameters may be combined based on the weight.

In some implementations, one of the one or more signal parameters may be associated with a change of a power-delay profile. A first power-delay profile may be estimated based on a first reference signal occurrence, and a second power-delay profile may be estimated based on a second reference signal occurrence. It may be determined that the power-delay profile has changed if the first power-delay profile differs substantially from the second power-delay profile.

In another aspect of the present disclosure, a system is provided for identifying whether a signal is an LTE signal. The system may include receiving circuitry configured to receive the signal and control circuitry configured to compute a measurement of the signal. The control circuitry may be further configured to determine a signal parameter corresponding to a system parameter specific to an LTE standard based on the measurement, and identify whether the signal is an LTE signal based on the signal parameter.

In some implementations, the signal parameter may be a peak-to-average power ratio and the control circuitry may be further configured to compute the peak-to-average ratio based on a portion of the received signal and identify whether the signal is an LTE signal based on determining whether the peak-to-average power ratio is above a predefined threshold.

In some implementations, the signal parameter may be a correlation measure and the control circuitry may be further configured to compute a first metric related to a total energy contained in a first portion of the signal corresponding to a symbol duration and a second metric related to the correlation of the first portion of the signal with a second portion of the signal corresponding to a cyclic prefix. The control circuitry may identify whether the signal is an LTE signal based on comparing the correlation measure to a predefined threshold.

In some implementations, the signal parameter may be used, at least in part, to preform one or more of automatic front-end gain control, synchronization, channel estimation, and noise-variance estimation. In some implementations, the measurement may include one of a channel quality measurement, a radio-link monitoring measurement, and a determination of whether the received signal is of internal or external origin.

In some implementations, the signal parameter may include one of a signal type, a signal strength, an operating band of the signal, and a bandwidth of the signal. In some implementations, the received signal may be one of an LTE signal, a Wi-Fi signal, and a Bluetooth signal.

In some implementations, the measurement may include a plurality of measurements and the control circuitry may be configured to determine one or more signal parameters for each of the plurality of measurements and identify whether the signal is an LTE signal based on combining the one or more signal parameters corresponding to each of the plurality of measurements. In some implementations, the control circuitry may be further configured to assign a weight to the one or more signal parameters corresponding to each of the plurality of measurements and combine the one or more signal parameters based on the weight.

In some implementations, one of the one or more signal parameters may be associated with a change of a power-delay profile and the control circuitry may be further configured to estimate a first power-delay profile based on a first reference signal occurrence and a second power-delay profile based on a second reference signal occurrence. The control circuitry may further determine that the power-delay profile has changed if the first power-delay profile differs substantially from the second power-delay profile.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method of identifying whether a signal is a Long Term Evolution (LTE) signal, the method comprising:
   receiving, using control circuitry, the signal;
   computing, using the control circuitry, a measurement of the signal;
   determining a signal parameter corresponding to a system parameter specific to an LTE standard based on the measurement;
   identifying whether the signal is the LTE signal based on the signal parameter,
   wherein the signal parameter is a correlation measure;
   computing a first metric related to a total energy contained in a first portion of the signal corresponding to a symbol duration;
   computing a second metric related to a correlation of the first portion of the signal with a second portion of the signal corresponding to a cyclic prefix;
   determining a ratio of the first metric and the second metric to obtain the correlation measure; and
   identifying whether the signal is the LTE signal based on comparing the correlation measure to a predefined threshold.

2. The method of claim 1, wherein the signal parameter is a peak-to-average power ratio, the method further comprising:
   computing the peak-to-average power ratio for a portion of the received signal; and
   identifying whether the signal is an LTE signal based on determining whether the peak-to-average power ratio is above a predefined threshold.

3. The method of claim 1, wherein the signal parameter is used, at least in part, to perform one or more of automatic front-end gain control, synchronization, channel estimation, and noise-variance estimation.

4. The method of claim 1, wherein the measurement comprises one of a channel quality measurement, a radio-link monitoring measurement, an out-of-band interference detection measurement, and a determination of whether the received signal is of internal or external origin.

5. The method of claim 1, wherein the signal parameter comprises one of a signal type, a signal strength, an operating band of the signal, and a bandwidth of the signal.

6. The method of claim 1, wherein the received signal is one of an LTE signal, a Wi-Fi signal, and a Bluetooth signal.

7. The method of claim 1, wherein the measurement comprises a plurality of measurements, the method further comprising:
   determining one or more signal parameters for each of the plurality of measurements; and
   identifying whether the signal is an LTE signal based on combining the one or more signal parameters corresponding to each of the plurality of measurements.

8. The method of claim 7, further comprising:
   assigning a weight to the one or more signal parameters corresponding to each of the plurality of measurements; and
   combining the one or more signal parameters corresponding to each of the plurality of measurements based on the weight.

9. The method of claim 7, wherein one of the one or more signal parameters is associated with a change of a power-delay profile, the method further comprising:
   estimating a first power-delay profile based on a first reference signal occurrence and a second power-delay profile based on a second reference signal occurrence; and
   determining that the power-delay profile has changed if the first power-delay profile differs substantially from the second power-delay profile.

10. A system for identifying whether a signal is a Long Term Evolution (LTE) signal, the system comprising:
    receiving circuitry configured to receive the signal; and
    control circuitry configured to:
      compute a measurement of the signal;
      determine a signal parameter corresponding to a system parameter specific to an LTE standard based on the measurement;
      identify whether the signal is the LTE signal based on the signal parameter,
      wherein the signal parameter is a correlation measure;
      compute a first metric related to a total energy contained in a first portion of the signal corresponding to a symbol duration;
      compute a second metric related to a correlation of the first portion of the signal with a second portion of the signal corresponding to a cyclic prefix;
      determine a ratio of the first metric and the second metric to obtain the correlation measure; and
      identify whether the signal is the LTE signal based on comparing the correlation measure to a predefined threshold.

11. The system of claim 10, wherein the signal parameter is a peak-to-average power ratio and the control circuitry is further configured to:
    compute the peak-to-average power ratio for a portion of the received signal; and
    identify whether the signal is an LTE signal based on determining whether the peak-to-average power ratio is above a predefined threshold.

12. The system of claim 10, wherein the signal parameter is used, at least in part, to perform one or more of automatic front-end gain control, synchronization, channel estimation, and noise-variance estimation.

13. The system of claim 10, wherein the measurement comprises one of a channel quality measurement, a radio-link monitoring measurement, an out-of-band interference detection measurement, and a determination of whether the received signal is of internal or external origin.

14. The system of claim 10, wherein the signal parameter comprises one of a signal type, a signal strength, an operating band of the signal, and a bandwidth of the signal.

15. The system of claim 10, wherein the received signal is one of an LTE signal, a Wi-Fi signal, and a Bluetooth signal.

16. The system of claim 10, wherein the measurement comprises a plurality of measurements and the control circuitry is further configured to:
  determine one or more signal parameters for each of the plurality of measurements; and
  identify whether the signal is an LTE signal based on combining the one or more signal parameters corresponding to each of the plurality of measurements.

17. The system of claim 16, wherein the control circuitry is further configured to:
  assign a weight to the one or more signal parameters corresponding to each of the plurality of measurements; and
  combine the one or more signal parameters corresponding to each of the plurality of measurements based on the weight.

18. The system of claim 16, wherein one of the one or more signal parameters is associated with a change of a power-delay profile and the control circuitry is further configured to:
  estimate a first power-delay profile based on a first reference signal occurrence and a second power-delay profile based on a second reference signal occurrence; and
  determine that the power-delay profile has changed if the first power-delay profile differs substantially from the second power-delay profile.

* * * * *